(12) United States Patent
Xiao

(10) Patent No.: US 6,951,256 B1
(45) Date of Patent: Oct. 4, 2005

(54) MACHINE TOOL HAVING COAXIAL DRIVING DEVICE

(76) Inventor: Ru Song Xiao, 16F-2, No. 366-5, Sec. 2, Wunsin Road, Situn Chu, Taichung (TW) 407

( * ) Notice: Subject to any disclaimer, the term of this patent is extended or adjusted under 35 U.S.C. 154(b) by 0 days.

(21) Appl. No.: 10/831,666

(22) Filed: Apr. 24, 2004

(51) Int. Cl.⁷ .............................................. E21B 19/18
(52) U.S. Cl. ........................ 173/213; 173/4; 173/165; 408/239 A; 409/233
(58) Field of Search ................................ 173/132, 163, 173/165, 213; 408/239 A, 239 R; 409/231–233

(56) References Cited

U.S. PATENT DOCUMENTS

| | | | |
|---|---|---|---|
| 2,941,446 A | | 6/1960 | Senglet |
| 3,538,778 A | | 11/1970 | Harris |
| 4,018,113 A | | 4/1977 | Blazenin et al. .............. 82/2 B |
| 4,604,012 A | * | 8/1986 | Kawasaki et al. .......... 409/233 |
| 4,628,586 A | * | 12/1986 | Yoshimi et al. ............... 483/30 |
| 4,708,547 A | * | 11/1987 | Baron ........................ 409/233 |
| 4,916,341 A | * | 4/1990 | Mantovani .................... 310/50 |
| 4,925,348 A | * | 5/1990 | Krusi .......................... 409/231 |
| 5,078,558 A | * | 1/1992 | Arai et al. ................... 409/233 |
| 5,096,347 A | * | 3/1992 | Kumagai et al. ........... 409/233 |
| 5,782,586 A | * | 7/1998 | Geissler ....................... 408/56 |
| 5,980,172 A | * | 11/1999 | Shoda ......................... 409/203 |
| 6,174,115 B1 | * | 1/2001 | Hashidate et al. .......... 409/231 |
| 6,287,059 B1 | * | 9/2001 | Hashidate et al. .......... 409/233 |

* cited by examiner

*Primary Examiner*—Stephen F. Gerrity
*Assistant Examiner*—Thanh Truong
(74) *Attorney, Agent, or Firm*—Charles E. Baxley

(57) ABSTRACT

A machine tool includes a housing slidably supported on a table, a moving device may be used to move the housing up and down relative to the table, a tubular shaft is rotatably received within the housing and includes a bore to receive a chuck device which may couple a tool member to the tubular shaft. A rotating device may be used for rotating the tubular shaft relative to the housing, with such as an interaction between a stator and a rotor. The tubular shaft is rotatably received within the housing, and may be smoothly rotated or driven by the rotating device without generating shocks or vibrations.

13 Claims, 4 Drawing Sheets

MACHINE TOOL HAVING COAXIAL DRIVING DEVICE

BACKGROUND OF THE INVENTION

1. Field of the Invention

The present invention relates to a machine tool, and more particularly to a machine tool having a coaxial driving device to suitably drive or rotate the tool members without generating shocks or vibrations.

2. Description of the Prior Art

Various kinds of typical machine tools comprise a cutting tool or various machining tool members, and a motor driving mechanism coupled to the tool members, to rotate or to drive the tool members, in order to cut or to machine various objects or work pieces.

For example. U.S. Pat. No. 2,941,446 to Senglet, U.S. Pat. No. 3,538,778 to Harris, and U.S. Pat. No. 4,018,113 to Blazemin et al. disclose three of the typical machine tools each also comprising a cutting tool or a machining tool member that is required to be coupled to, and rotated or driven by motor driving mechanisms.

Normally, the cutting tools or the machining tool members include an axle offset from the driving spindles of the motor driving mechanisms, and coupled to the driving spindles of the motor driving mechanisms with various coupling devices or members or mechanisms, to allow the tool members to be rotated or driven by the motor driving mechanisms.

However, due to the separation or the offset of the tool members from the driving spindles of the motor driving mechanisms, a driving torque may be formed between the tool members and the driving spindles of the motor driving mechanisms, such that shocks or vibrations may have a great chance to be generated by the tool members, and such that the work pieces may not be precisely cut or machined by the tool members. In addition, the work pieces may have a good chance to be damaged by the tool members, and the working life of the tool members may thus be greatly decreased.

The present invention has arisen to mitigate and/or obviate the afore-described disadvantages of the conventional machine tools.

SUMMARY OF THE INVENTION

The primary objective of the present invention is to provide a machine tool including a coaxial driving device to suitably drive or rotate the tool members without generating shocks or vibrations.

The other objective of the present invention is to provide a machine tool including a coaxial driving device to increase the machining precision and to prevent the tool members from being damaged and to increase the working life for the machine tool.

In accordance with one aspect of the invention, there is provided a machine tool comprising a table, a housing slidably supported on the table, a moving device for moving the housing up and down relative to the table, a tubular shaft rotatably received within the housing, and including a bore formed therein, a chuck device disposed in the bore of the tubular shaft, a tool member attached to the tubular shaft with the chuck device, and a rotating device for rotating the tubular shaft relative to the housing. The tubular shaft is rotatably received within the housing, and may be smoothly rotated or driven by the rotating device without generating shocks or vibrations.

The rotating device includes a stator attached to the housing, and a rotor attached to the tubular shaft, to allow the tubular shaft to be rotated relative to the housing by an interaction between the rotor and the stator.

The chuck device includes a plurality of pawls, and a forcing device may further be provided for forcing the pawls to engage with and to grip the tool member, and includes a barrel secured to the tubular shaft to slidably receive the pawls, and an actuator provided on each of the pawls and to be actuated by the barrel to force the pawls to engage with and to grip the tool member.

The chuck device includes a stem slidably received in the barrel, the pawls are attached to the stem, and moveable up and down relative to the barrel and the tubular shaft together with the stem. The chuck device includes a plurality of balls engaged between the stem and the pawls, to pivotally couple the pawls to the stem.

The stem includes a protrusion extended therefrom, the barrel includes at least one protuberance extended therefrom, to engage with the protrusion of the stem and to limit the stem to slide relative to the barrel.

A biasing device may further be provided for biasing the stem to move the pawls into the barrel, and includes at least one spring member engaged onto the stem and engaged with the barrel, to bias the pawls into the barrel.

Each of the pawls includes a projection laterally extended inwardly therefrom to engage with and to grip the tool member. The tool member includes a shank and an enlarged head provided thereon for engaging with the projections of the pawls.

The moving device includes a bolt threaded with the housing, to move the housing up and down relative to the table by rotating the bolt relative to the housing. The moving device includes a motor coupled to the bolt, to rotate the bolt relative to the housing.

A plate may further be provided and disposed on the table, the motor is attached to the plate, and the bolt is coupled to the motor and rotatably received in the housing. The bolt is rotatably received in the bore of the tubular shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
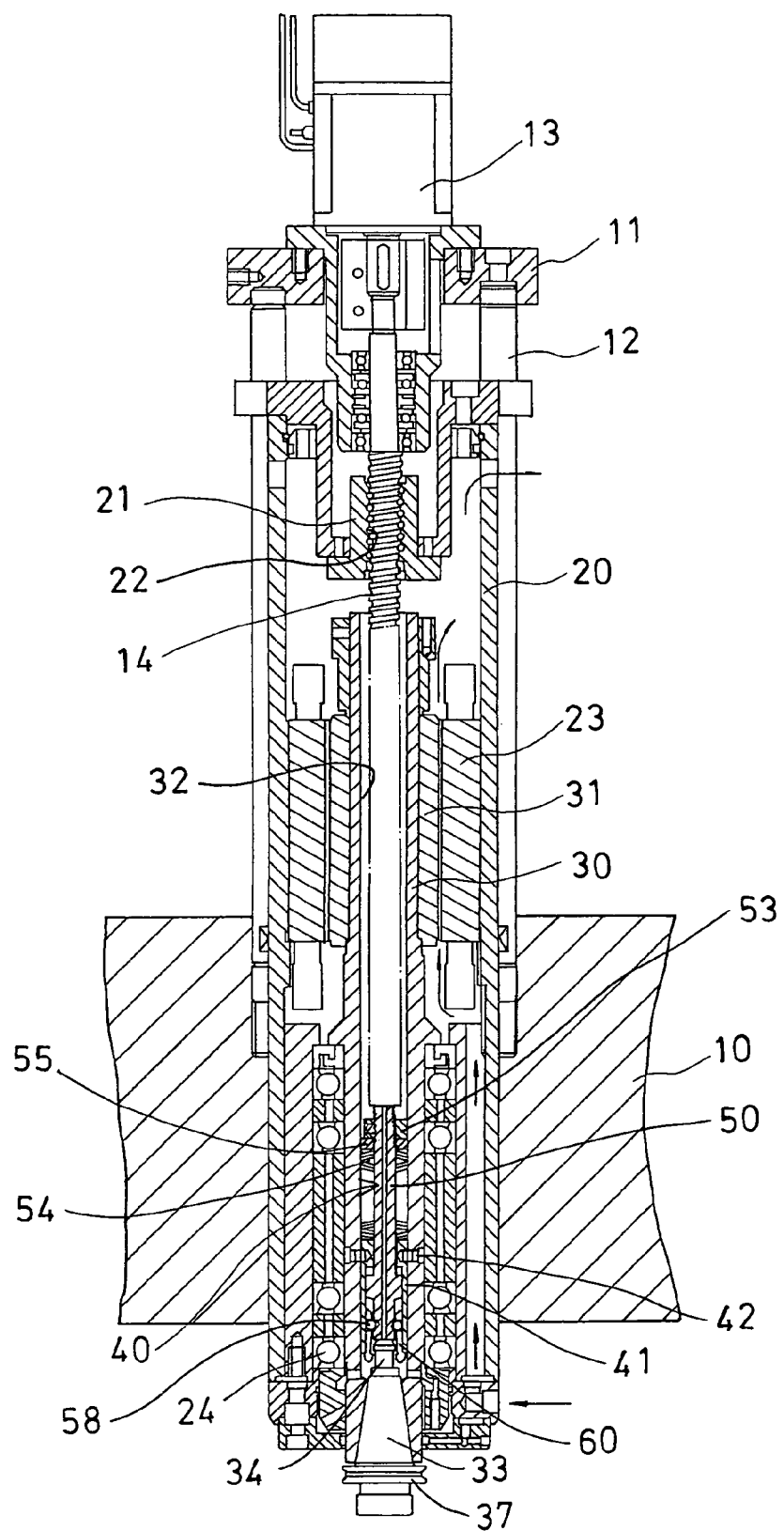
FIG. 1 is a partial cross sectional view of a machine tool in accordance with the present invention.

Referring to the drawings, and initially to FIG. 1, a machine tool in accordance with the present invention comprises a base or a working table 10, a plate 11 disposed or supported on the working table 10 with one or more posts 12, and a driving motor 13 attached to or disposed on the plate 11, such as disposed on top of the plate 11. A bolt 14 is attached to the driving motor 13 and to be rotated or driven by the driving motor 13.

A housing 20 is slidably disposed between the working table 10 and the plate 11. For example, the housing 20 may be slidably attached to either or all of the posts 12, to allow the housing 20 to be slidably guided to move up and down between the working table 10 and the plate 11, or to allow the housing 20 to be moved upwardly away from and downwardly toward the work pieces (not shown).

The housing 20 includes a nut or a block 21 attached to the upper portion thereof, and having an inner thread 22 formed therein, to thread with the bolt 14, and thus to allow the housing 20 to be moved up and down relative to the working table 10 and the plate 11 by the bolt 14 and the motor 13, or when the bolt 14 is rotated or driven by the motor 13. The housing 20 includes a stator 23 disposed in the inner portion thereof.

A tubular shaft 30 is rotatably received in the housing 20, and includes a rotor 31 attached thereto, such as attached to the upper and outer portion thereof, and received in the stator 23 of the housing 20, for being acted by the stator 23, and for allow the tubular shaft 30 to be rotated or driven by the interaction between the rotor 31 and the stator 23. For example, the tubular shaft 30 may be rotatably secured to the housing 20 with one or more bearings 24 (FIGS. 1, 2).

The tubular shaft 30 includes a bore 32 formed therein to receive the bolt 14 therein, and to allow the bolt 14 and the tubular shaft 30 to be coaxial. The tubular shaft 30 is provided to support a cutting or machining tool member 33, for allowing the tool member 33 to be rotated in concert with the tubular shaft 30 relative to the housing 20. In addition, the tubular shaft 30 and the housing 20 may be moved or adjusted up and down relative to the working table 10 and the plate 11 and thus the work pieces by the bolt 14.

As shown in FIGS. 1–4, a gripping or chuck device 40 is provided to attach or to grip or to secure the tool member 33 to the tubular shaft 30. The tool member 33 includes a shank 34 extended from or provided on top thereof, and an enlarged head 35 formed or provided on top of the shank 34, for allowing the tool member 33 to be attached or gripped or secured to the tubular shaft 30 with the gripping or chuck device 40.

Figure 2:
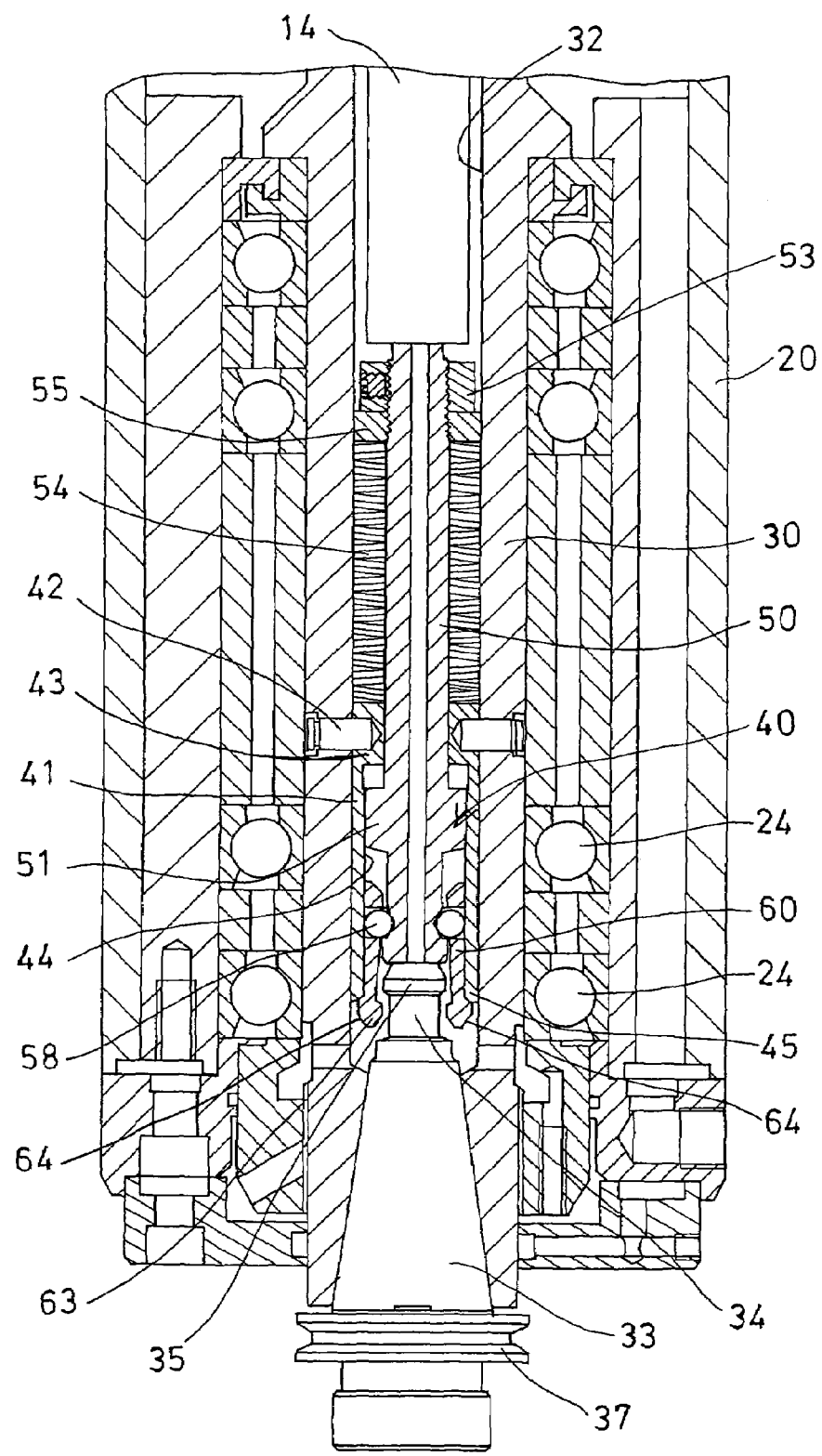
FIG. 2 is an enlarged partial cross sectional view of the machine tool.
Figure 3:
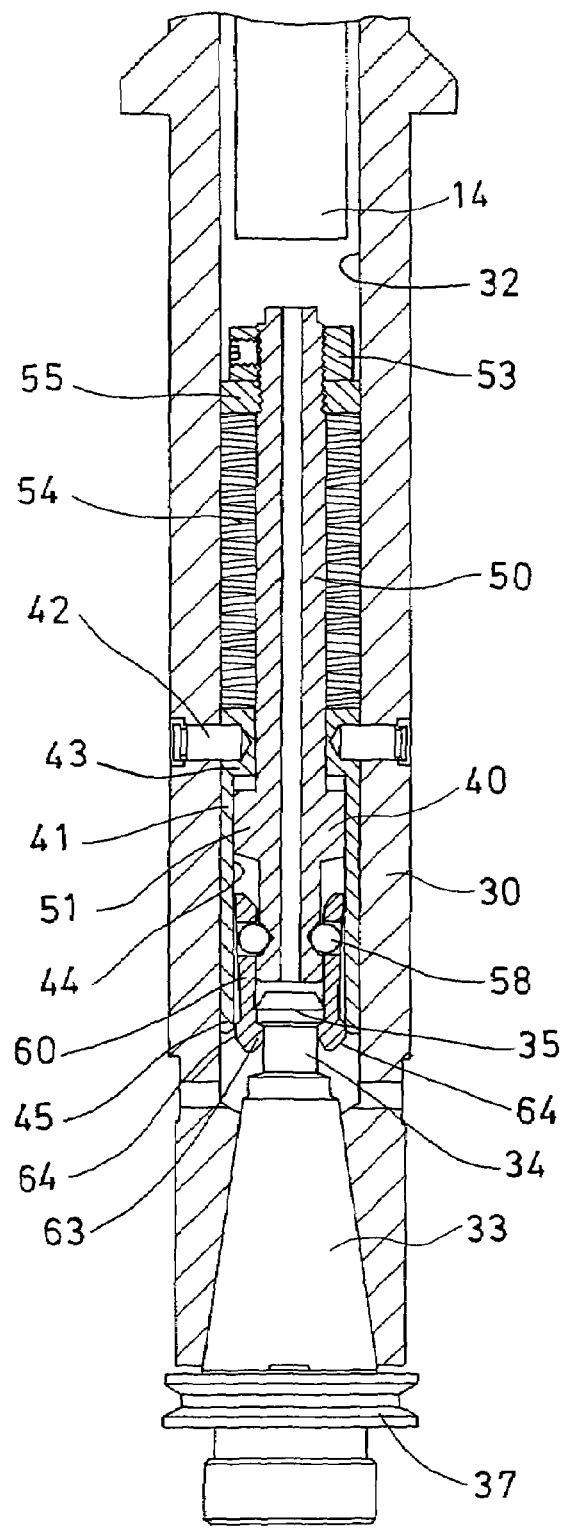
FIG. 3 is another enlarged partial cross sectional view of the machine tool.
Figure 4:
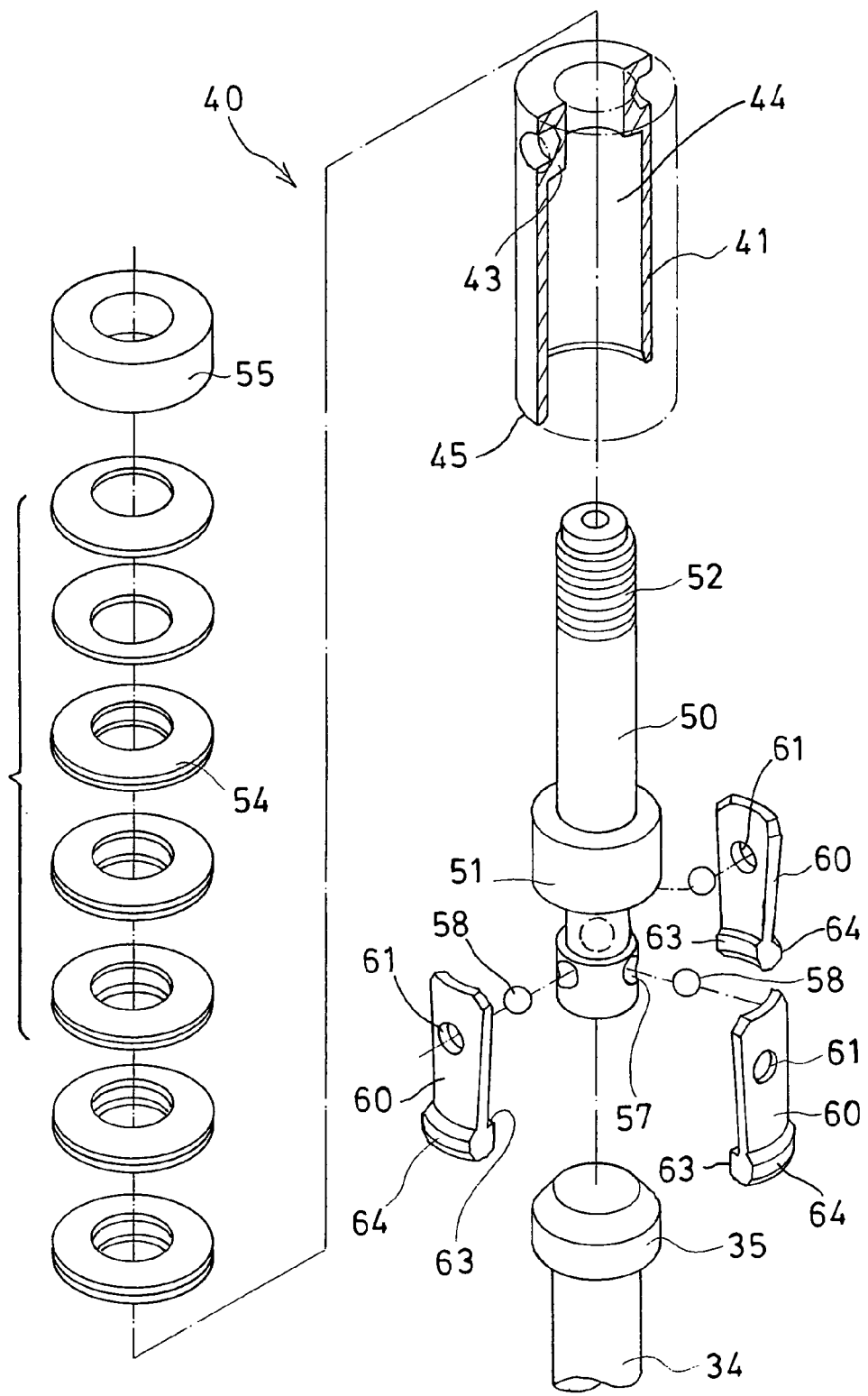
FIG. 4 is a partial exploded view illustrating a chuck device for gripping or attaching tool members to the machine tool.

As best shown in FIGS. 2–4, the gripping or chuck device 40 includes a barrel 41 received in the bore 32 of the tubular shaft 30, and secured to the tubular shaft 30 with one or more fasteners 42, such that the barrel 41 is secured to and moved in concert with the tubular shaft 30. The barrel 41 includes one or more protuberances 43 extended into a chamber 44 thereof.

The chuck device 40 further includes a stem 50 slidably engaged in the chamber 44 of the barrel 41, and a protrusion 51 extended laterally or radially out of the stem 50, to engage with the protuberances 43 of the barrel 41, and to limit the sliding movement of the stem 50 relative to the barrel 41. The stem 50 includes an outer thread 52 formed or provided on top thereof, for threading or securing a lock nut 53 thereto.

One or more washers or spring members 54 are engaged onto the stem 50 and engaged with the barrel 41, and a gasket 55 is also engaged onto the stem 50 and engaged with the washers or spring members 54, and engaged with the lock nut 53, to stably retain the spring members 54 between the barrel 41 and the lock nut 53 of the stem 50, and to allow the spring members 54 to bias or to force the stem 50 upwardly relative to the barrel 41 and the tubular shaft 30, or to force the protrusion 51 of the stem 50 toward or to engage with the protuberances 43 of the barrel 41 (FIG. 3).

The stem 50 further includes one or more, such as three depressions 57 formed or provided in the lower portion thereof, each for partially receiving a ball 58 therein. One or more, such as three pawls 60 are disposed around the lower portion of the stem 50, and each includes an orifice 61 formed therein to partially receive the balls 58 respectively, and to pivotally attach or secure the pawls 60 to the stem 50, and to allow the pawls 60 to be moved up and down relative to the barrel 41 and the tubular shaft 30 together with the stem 50.

Each of the pawls 60 includes a projection 63 laterally extended inwardly from such as the lower portion thereof, for engaging with the shank 34 and/or the enlarged head 35 of the tool member 33 (FIGS. 1, 3), and for gripping or securing the tool member 33 to the stem 50 and the barrel 41 and thus to the tubular shaft 30.

Each of the pawls 60 further includes a bulge or actuator 64 laterally extended outwardly from such as the lower portion thereof, for engaging with the lower portion 45 of the barrel 41, and for actuating or forcing the projection 63 of the pawls 60 to move laterally and inwardly to engage with the shank 34 and/or the enlarged head 35 of the tool member 33 (FIGS. 1, 3), and thus to grip or secure the tool member 33 to the stem 50 and the barrel 41 and thus to the tubular shaft 30.

In operation, as shown in FIGS. 1 and 3, the stem 50 and thus the pawls 60 may be biased upwardly relative to the barrel 41 by the spring members 54, to allow the pawls 60 to be moved or forced into the chamber 44 of the barrel 41, and to allow the lower portion 45 of the barrel 41 to engage with the actuators 64 of the pawls 60, and thus to actuate or force the projection 63 of the pawls 60 to move laterally and inwardly to engage with the shank 34 and/or the enlarged head 35 of the tool member 33, and to grip or secure the tool member 33 to the stem 50 and the barrel 41 and thus to the tubular shaft 30.

The tubular shaft 30 and thus the tool member 33 may be rotated or driven by the interaction between the rotor 31 and the stator 23, to allow the tool member 33 to cut or to machine various objects or work pieces. Alternatively, the tool member 33 may include a pulley 37 provided thereon, for coupling to the other driving devices or mechanisms (not shown), and for allowing the tool member 33 to be rotated or driven to cut or to machine the objects or work pieces.

When the housing 20 is moved upwardly relative to the working table 10 and the plate 11 by the bolt 14 and the motor 13, the tubular shaft 30 and the stem 50 of the chuck device 40 may also be moved upwardly relative to the working table 10 and the plate 11 by or together with the housing 20. As shown in FIG. 2, when the stem 50 is moved upwardly to engage with the bolt 14, the stem 50 may be forced or moved downwardly relative to the barrel 41 and the tubular shaft 30, to disengage the actuators 64 of the pawls 60 from the lower portion 45 of the barrel 41.

As also shown in FIG. 2, when the actuators 64 of the pawls 60 are disengaged from the lower portion 45 of the barrel 41, the projection 63 of the pawls 60 may be moved or disengaged from the shank 34 and/or the enlarged head 35 of the tool member 33, such that the tool member 33 may be released and disengaged from the stem 50 and the barrel 41 and the tubular shaft 30, and may be changed or replaced with the other tool members 33.

It is to be noted that the motor 13 and the bolt 14 and the stem 50 and the tool member 33 are aligned or arranged in line with each other, and the tubular shaft 30 and the housing 20 are concentric or coaxial with the bolt 14 and the stem 50, such that the tool member 33 may be suitably or smoothly rotated or driven by the interaction between the rotor 31 and the stator 23, or by the other driving devices or mechanisms, without generating shocks or vibrations.

In addition, the bolt 14 and the stem 50 and the tubular shaft 30 may be received in the housing 20, such that the machine tool may include a greatly reduced volume and may thus be easily disposed in any places. Furthermore, the machine tool may include fewer parts or elements that may be easily manufactured with greatly decreased cost, and that may be easily assembled by workers.

Accordingly, the machine tool in accordance with the present invention includes a coaxial driving device to suitably drive or rotate the tool members without generating shocks or vibrations, and to increase the machining precision, and to prevent the tool members from being damaged, and to increase the working life for the machine tool.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A machine tool comprising:
   a table,
   a housing slidably supported on said table,
   means for moving said housing up and down relative to said table, said moving means including a bolt threaded with said housing, to move said housing up and down relative to said table by rotating said bolt relative to said housing,
   a tubular shaft rotatably received within said housing, and including a bore formed therein, said bolt being rotatably received in said bore of said tubular shaft,
   a chuck device disposed in said bore of said tubular shaft,
   a tool member attached to said tubular shaft with said chuck device, and
   means for rotating said tubular shaft relative to said housing.

2. The machine tool as claimed in claim 1, wherein said rotating means includes a stator attached to said housing, and a rotor attached to said tubular shaft, to allow said tubular shaft to be rotated relative to said housing by an interaction between said rotor and said stator.

3. The machine tool as claimed in claim 1, wherein said chuck device includes a plurality of pawls, and means for forcing said pawls to engage with and to grip said tool member.

4. The machine tool as claimed in claim 3, wherein said forcing means includes a barrel secured to said tubular shaft to slidably receive said pawls, and an actuator provided on each of said pawls and to be actuated by said barrel to force said pawls to engage with and to grip said tool member.

5. The machine tool as claimed in claim 4, wherein said chuck device includes a stem slidably received in said barrel, said pawls are attached to said stem, and moveable up and down relative to said barrel and said tubular shaft together with said stem.

6. The machine tool as claimed in claim 5 further comprising means for biasing said stem to move said pawls into said barrel.

7. The machine tool as claimed in claim 6, wherein said biasing means includes at least one spring member engaged onto said stem and engaged with said barrel, to bias said pawls into said barrel.

8. The machine tool as claimed in claim 3, wherein each of said pawls includes a projection laterally extended inwardly therefrom to engage with and to grip said tool member.

9. The machine tool as claimed in claim 8, wherein said tool member includes a shank and an enlarged head provided thereon for engaging with said projections of said pawls.

10. The machine tool as claimed in claim 1, wherein said moving means includes a motor coupled to said bolt, to rotate said bolt relative to said housing.

11. The machine tool as claimed in claim 10 further comprising a plate disposed on said table, said motor is attached to said plate, and said bolt is coupled to said motor and rotatably received in said housing.

12. A machine tool comprising:
    a table,
    a housing slidably supported on said table,
    means for moving said housing up and down relative to said table,
    a tubular shaft rotatable received within said housing, and including a bore formed therein,
    a chuck device disposed in said bore of said tubular shaft, said chuck device including a plurality of pawls,
    a tool member attached to said tubular shaft with said chuck device,
    means for forcing said pawls to engage with and to grip said tool member, and said forcing means including a barrel secured to said tubular shaft to slidably receive said pawls, and an actuator provided on each of said pawls and to be actuated by said barrel to force said pawls to engage with and to grip said tool member,
    said chuck device including a stem slidably received in said barrel, said pawls being attached to said stem, and moveable up and down relative to said barrel and said tubular shaft together with said stem, said chuck device including a plurality of balls engaged between said stem and said pawls, to pivotally couple said pawls to said stem, and
    means for rotating said tubular shaft relative to said housing.

13. A machine tool comprising:
    a table,
    a housing slidably supported on said table,
    means for moving said housing up and down relative to said table,
    a tubular shaft rotatable received within said housing, and including a bore formed therein,
    a chuck device disposed in said bore of said tubular shaft, said chuck device including a plurality of pawls,
    a tool member attached to said tubular shaft with said chuck device,
    means for forcing said pawls to engage with and to grip said tool member, and said forcing means including a barrel secured to said tubular shaft to slidably receive said pawls, and an actuator provided on each of said pawls and to be actuated by said barrel to force said pawls to engage with and to grip said tool member,
    said chuck device including a stem slidably received in said barrel, said pawls being attached to said stem, and moveable up and down relative to said barrel and said tubular shaft together with said stem, said stem including a protrusion extended therefrom, said barrel including at least one protuberance extended therefrom, to engage with said protrusion of said stem and to limit said stem to slide relative to said barrel, and
    means for rotating said tubular shaft relative to said housing.

* * * * *